United States Patent
Burrato

(10) Patent No.: US 9,945,289 B2
(45) Date of Patent: Apr. 17, 2018

(54) ORGANIC RANKINE CYCLE FOR MECHANICAL DRIVE APPLICATIONS

(71) Applicant: Nuovo Pignone Srl, Florence (IT)

(72) Inventor: Andrea Burrato, Florence (IT)

(73) Assignee: Nuovo Pignone Srl, Florence (IT)

( * ) Notice: Subject to any disclaimer, the term of this patent is extended or adjusted under 35 U.S.C. 154(b) by 386 days.

(21) Appl. No.: 14/040,920

(22) Filed: Sep. 30, 2013

(65) Prior Publication Data

US 2014/0090376 A1  Apr. 3, 2014

(30) Foreign Application Priority Data

Oct. 1, 2012 (IT) .................. F12012A0193

(51) Int. Cl.
| | |
|---|---|
| *F02G 3/00* | (2006.01) |
| *F02B 39/08* | (2006.01) |
| *F01K 23/10* | (2006.01) |
| *F01K 25/10* | (2006.01) |
| *F02C 6/18* | (2006.01) |
| *F02G 5/02* | (2006.01) |
| *F02C 1/05* | (2006.01) |

(52) U.S. Cl.
CPC ............ *F02B 39/085* (2013.01); *F01K 23/10* (2013.01); *F01K 25/10* (2013.01); *F02C 1/05* (2013.01); *F02C 6/18* (2013.01); *F02G 5/02* (2013.01); *Y02E 20/16* (2013.01)

(58) Field of Classification Search
CPC .... F01K 23/10; F02C 6/18; F02C 1/05; F02B 39/085; F02G 5/02

USPC ................................................. 60/614–624
See application file for complete search history.

(56) References Cited

U.S. PATENT DOCUMENTS

| | | | |
|---|---|---|---|
| 4,935,355 | A | 6/1990 | Ulmer et al. |
| 4,953,355 | A | 9/1990 | Poulain |
| 6,347,520 | B1 | 2/2002 | Ranasinghe et al. |
| 7,493,763 | B2 | 2/2009 | Klochko et al. |
| 2010/0319346 | A1* | 12/2010 | Ast .................... F01K 23/04 60/616 |
| 2015/0292349 | A1* | 10/2015 | Mariotti ................ F02C 6/18 415/1 |

FOREIGN PATENT DOCUMENTS

| | | |
|---|---|---|
| CN | 101614139 A | 12/2009 |
| CN | 101769182 A | 7/2010 |

(Continued)

OTHER PUBLICATIONS

EP Search Report issued in connection with corresponding EP Patent Application No. 13186436 dated Jul. 4, 2014.

(Continued)

*Primary Examiner* — Ngoc T Nguyen
(74) *Attorney, Agent, or Firm* — GE Global Patent Operation

(57) ABSTRACT

A combined thermodynamic system for the production of mechanical power. The system comprises a gas turbine and a turbomachinery driven by the gas turbine. The system further comprises a thermodynamic organic Rankine cycle with a turboexpander. A heat transfer arrangement transfers heat from exhaust combustion gases of the gas turbine to the thermodynamic organic Rankine cycle, wherein heat is converted into mechanical power used for driving a driven a turbomachine.

20 Claims, 4 Drawing Sheets

(56) References Cited

FOREIGN PATENT DOCUMENTS

| DE | 19907512 | 2/1999 |
| --- | --- | --- |
| DE | 10008125 | 8/2001 |
| DE | 102010004457 A1 | 7/2011 |
| EP | 0355545 A1 | 2/1990 |
| EP | 2434103 B | 11/2014 |
| JP | 2008-537058 A | 9/2008 |
| WO | 2005024188 | 3/2005 |
| WO | 2012123500 | 9/2012 |

OTHER PUBLICATIONS

Mech C: 11 A New Concept in Medium Steam Turbines: The TM RANGE11, Technical Review GEC Alsthom, GEC Alsthom, Paris, FR, No. 18, Oct. 1, 1995 (Oct. 1, 1995), pp. 1-08, XP000552046.
Italian Search Report from Corresponding Italian Application No. FI2012A000193, dated Jan. 21, 2013.
Salimbeni et al., "Compressors for Baseload LNG Service",11th International Conference and Exhibition on Liquified Natural Gas, Birmingham, UK, Jul. 1995.
Unofficial English translation of Office Action issued in connection with corresponding CN Application No. 201310451085.0 dated Dec. 3, 2015.
Russian Office Action issued in connection with corresponding RU Application No. 2013143050 dated Jul. 10, 2017.
Unofficial English Translation of Japanese Office Action issued in connection with corresponding JP Application No. 2013200723 dated Aug. 1, 2017.

\* cited by examiner

Fig.1 STATE OF THE ART

ORGANIC RANKINE CYCLE FOR MECHANICAL DRIVE APPLICATIONS

BACKGROUND OF THE INVENTION

Embodiments of the subject matter disclosed herein generally relate to systems for mechanical power production from heat recovery.

Organic Rankine cycle (ORC) system have been used, as alternative to common water-steam Rankine cycle system, for waste heat recovery processes and are used for driving electric generators, thus transforming waste heat into useful electric energy.

FIG. 1 illustrates a combined gas turbine-ORC system for electric energy production. An organic Rankine cycle system is used for recovering waste heat from a gas turbine exhaust and converting it into electric energy by means of a double closed loop system. Reference number 101 indicates a gas turbine, e.g. used as a prime mover for an electric generator, schematically shown at 102. The exhaust combustion gases of the gas turbine 101 are cooled in a heat exchanger 103 and heat is extracted therefrom by means of a first closed loop 104. In the first closed loop 104 a diathermic oil is used as a heat transfer fluid to transfer the heat released by the gas turbine 101 to a fluid circulating in a second closed loop 105. The first closed loop 104 comprises a pump 106 and three serially arranged heat exchangers 107, 108 and 108*a*, where heat is transferred from the diathermic oil to the fluid circulating in the second closed loop 105.

The second closed loop 105 is a thermodynamic cycle based on the Rankine principle, wherein the working fluid is an organic fluid, in particular a heavy hydrocarbon, e.g. cyclopentane, or a refrigerant fluid with suitable characteristics.

The working fluid circulating in the second closed loop 105 is heated, vaporized and superheated in the three serially arranged heat exchangers 108*a*, 108 and 107, respectively, and expands in a turboexpander 109. The thermodynamic characteristics of the fluid allow a dry expansion to take place, i.e. the fluid at the discharge side of the turboexpander 109 is still in a gaseous state. A recuperator 110 is positioned downstream of the turboexpander 109. In the recuperator 110 the hot expanded fluid exchanges heat with the cold, high-pressure liquid obtained by condensing the expanded fluid in a condenser 112 and then pumping the condensate at the required upper pressure of the thermodynamic cycle by means of a pump 113. The liquid delivered by the pump 113 is pumped through the recuperator 110 and then the preheater, the vaporizer and the superheater exchangers 108*a*, 108, 107 closing the loop.

The turboexpander 109 is mechanically connected to an electric generator 115, which converts the mechanical power available on the output shaft of the turboexpander 109 into electric power.

The diathermic oil and the organic fluid circulating in the two closed loops allow low temperature heat sources to be exploited efficiently to produce electricity energy over a wide range of power output.

SUMMARY OF THE INVENTION

Embodiments of the disclosure provide a combined thermodynamic system for the production of mechanical power, comprising: a gas turbine; a turbomachine driven by the gas turbine; a thermodynamic organic Rankine cycle system, comprising a turboexpander; a heat transfer arrangement for transferring heat from exhaust combustion gases of the gas turbine to the thermodynamic organic Rankine cycle system; a driven turbomachine, driven by the turboexpander. In an embodiment, the turboexpander is an integrally geared multi-stage turboexpander. In some embodiments, the turbomachine driven by the gas turbine and by the turboexpander of the organic Rankine cycle system each can comprise one or more compressors, for example centrifugal compressors, or compressor trains.

Both thermodynamic cycles are used for mechanical drive purposes. The system is, in an embodiment, used in installations, where mechanical power is needed for driving one or more turbomachines, and where production of electric power is neither needed nor expedient. The use of an organic Rankine cycle system makes the system particularly suitable for use in locations, where water is unavailable or insufficient to run a water-steam Rankine cycle system.

The system can be used in oil-and-gas plants and installations. For instance, the gas turbine and the turboexpander can be used to drive compressors of a pipeline compression station or of a natural gas liquefaction system.

According to a further aspect, the present disclosure also relates to a method for producing mechanical power and driving turbomachine, comprising the steps of: providing a gas turbine; producing mechanical power with the gas turbine and driving a turbomachine therewith; transferring heat from exhaust combustion gases of the gas turbine to an organic Rankine cycle system; producing mechanical power with the organic Rankine cycle system by means of a multi-stage integrally geared multi-stage turboexpander, and driving a turbomachine therewith.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF THE EXEMPLARY EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
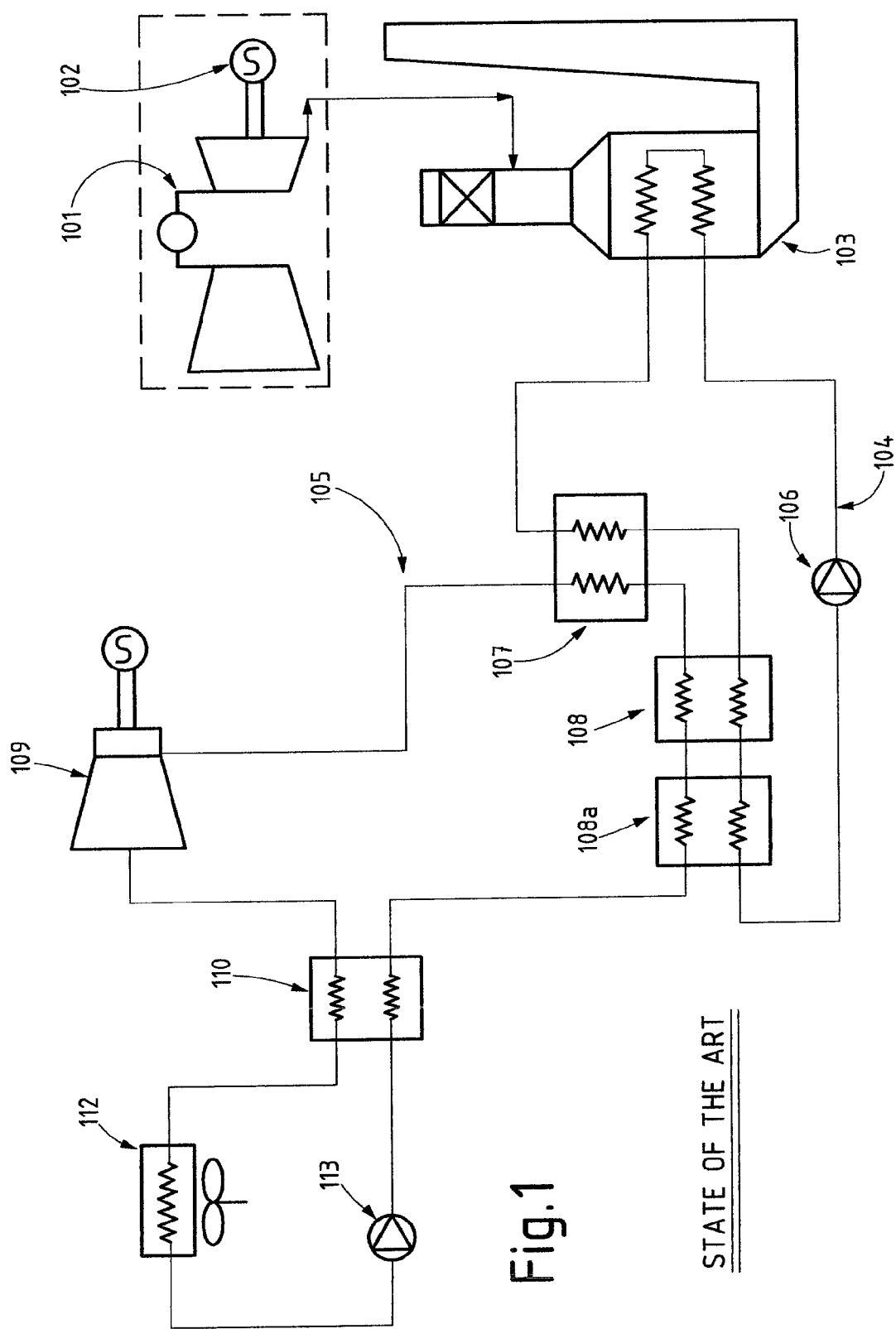
FIG. 1 illustrates a combined gas turbine-ORC system according to the related art.
Figure 2:
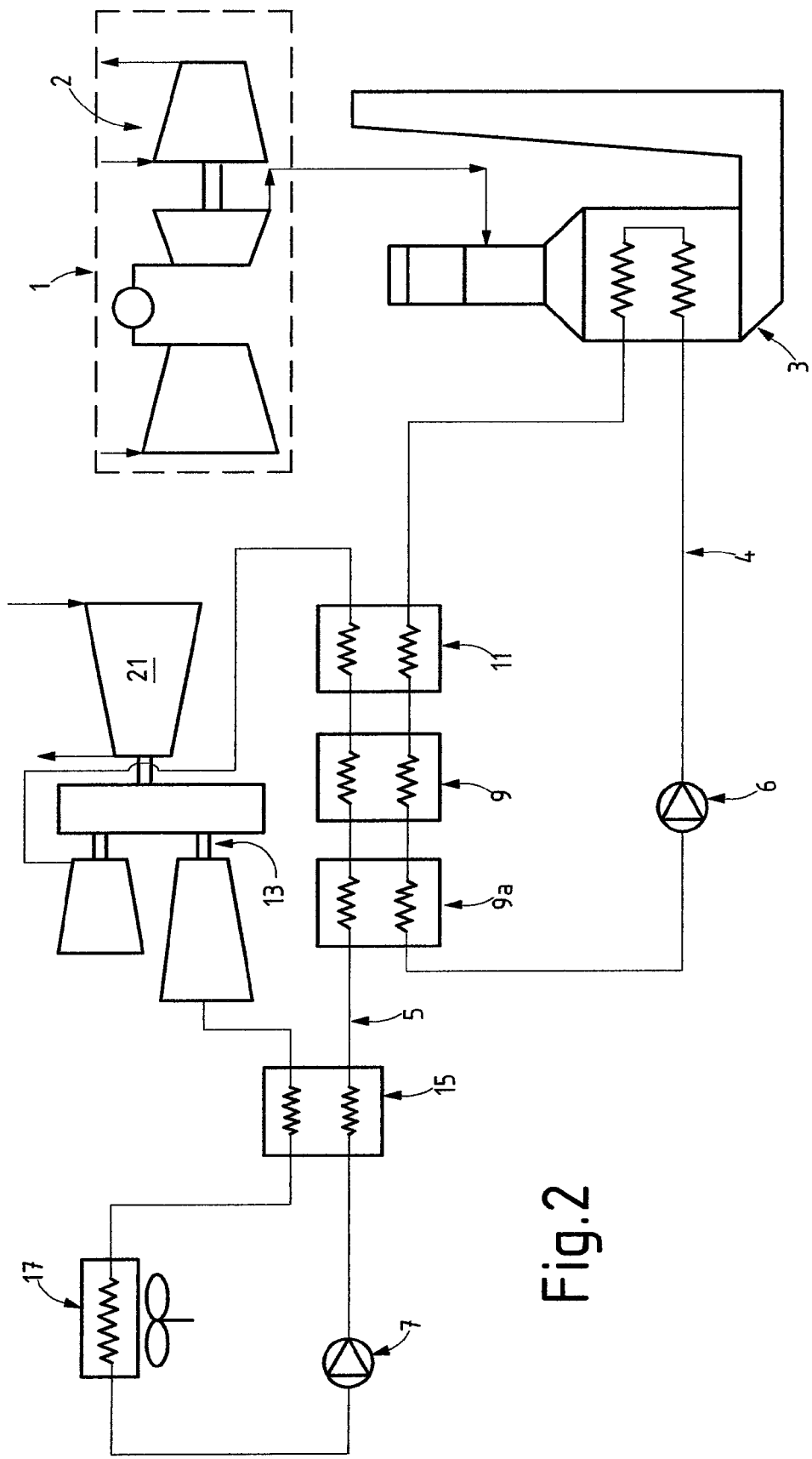
FIG. 2 illustrates a combined gas turbine-ORC system for mechanical drive purposes, according to the present disclosure.

Referring to FIG. 2, reference number 1 designates a gas turbine for driving a load 2. In some exemplary embodiments, the load can be a compressor or a compressor train. For instance, the gas turbine 1 can be used to drive one or more compressors in a natural gas liquefaction installation or in a pipeline compression station. In some embodiments, the gas turbine 1 can be a heavy-duty turbine. In other embodiments, the gas turbine 1 can be an aero derivative gas turbine.

The gas turbine 1 generates high-temperature combustion gases. Waste heat contained in the combustion gases is at least partly recovered, before discharging the combustion gases in the atmosphere, using an organic Rankine cycle system as disclosed here below.

For the purpose of heat recovery, in the exemplary embodiment of FIG. 2 the combustion gases flow through a heat recovery exchanger 3 before being discharged in the atmosphere.

A first closed loop 4 is used to remove heat from the heat exchanger 3 and transfer it to a second closed loop 5. In the first closed loop 4 a heat transfer fluid, for example diathermic oil, is used to transfer heat removed from the combustion gases into the second closed loop 5. Reference number 6 designates a circulating pump of first closed loop 4.

The second closed loop 5 is a thermodynamic cycle and more specifically an organic Rankine cycle system. A process fluid circulating in the second closed loop 5 is subject to thermodynamic transformations including condensing, pumping, heating, vaporizing, superheating, expanding, to transform heat energy into mechanical energy. A suitable working fluid, for example cyclopentane, or another suitable organic fluid usable in an organic Rankine cycle system, is circulating in the second closed loop 5.

In some exemplary embodiments, the second closed loop 5 comprises a circulating pump 7, a preheater 9a, a vaporizer 9, a superheater 11, a turboexpander 13, a recuperator 15 and a condenser 17. Additional components can be present in the circuit, as known to those skilled in the art, such as an expansion vessel.

The working fluid in the liquid state circulating in the second loop closed 5 is pumped at a first, high pressure level by the circulating pump 7. The pressurized fluid is heated in the preheater 9a, in the vaporizer 9 and in the superheater 11 by means of heat recovered by the fluid circulating in the first closed loop 4. A different number and arrangement of heat exchangers can be provided, e.g. only two heat exchangers, a heater and a superheater, respectively.

At the outlet of the superheater 11 the working fluid circulating in the second closed loop 5 is in a superheated, gaseous, high-pressure state. The high-pressure, superheated working fluid is then expanded in the turboexpander 13. Exhausted fluid exiting the turboexpander 13 at a second, low pressure level, flows through the heat recuperator 15 and is finally condensed in a condenser 17. The condensation is obtained for instance by means of heat exchange between the condensing working fluid and external air or water.

In the recuperator 15 low-temperature heat contained in the expanded fluid exiting the turboexpander 13 is exchanged against the cold pressurized fluid in the liquid state delivered by the circulating pump 7.

In the exemplary embodiment illustrated in FIG. 2, the turboexpander 13 is used as a mechanical drive for driving a load. The turboexpander 13 can be mechanically connected by means of a mechanical transmission 19 to a driven turbomachine 21. For instance, the driven turbomachine 21 can be a compressor, for example a centrifugal compressor or an axial compressor. In other embodiments, the turbomachine 21 can be a pump or another driven turbomachine. As illustrated in FIG. 2, in some embodiments, the turbomachine 21 works in parallel with a second turbomachine, such as the load 2.

In some exemplary embodiments, not shown, the first closed loop 4 can be omitted. In this case heat is directly transferred from the gas turbine discharge to the organic Rankine cycle system. The heater 9 and superheater 11 can be integrated in the heat exchanger 3. A more compact installation is obtained, with reduced heat losses and increased overall efficiency of the system.

In some embodiments, the turboexpander 13 can be a multistage, integrally geared turboexpander. In FIG. 2 the turboexpander 13 is represented as a two-stage, integrally geared turboexpander.

A fraction of the heat contained in the combustion gases discharged from the gas turbine 1 is thus transformed into useful mechanical power increasing the overall efficiency of the system and the overall mechanical power produced thereby.

The above described heat-recovery system has been described for improving the efficiency of a gas turbine installation, where the hot combustion gases of the gas turbine are cooled prior to being discharged in the atmosphere. The temperature range of the combustion gases is suitable for transforming the heat into mechanical power using an organic Rankine cycle system. The thermodynamic cycle does not require water and can therefore be used where water is unavailable and a common steam cycle could not be used.

The driven turbomachine 21, for instance a centrifugal compressor, can be used e.g. to process a refrigerant fluid in an LNG system or can be used to forward a gas in a pipeline.

Figure 3:
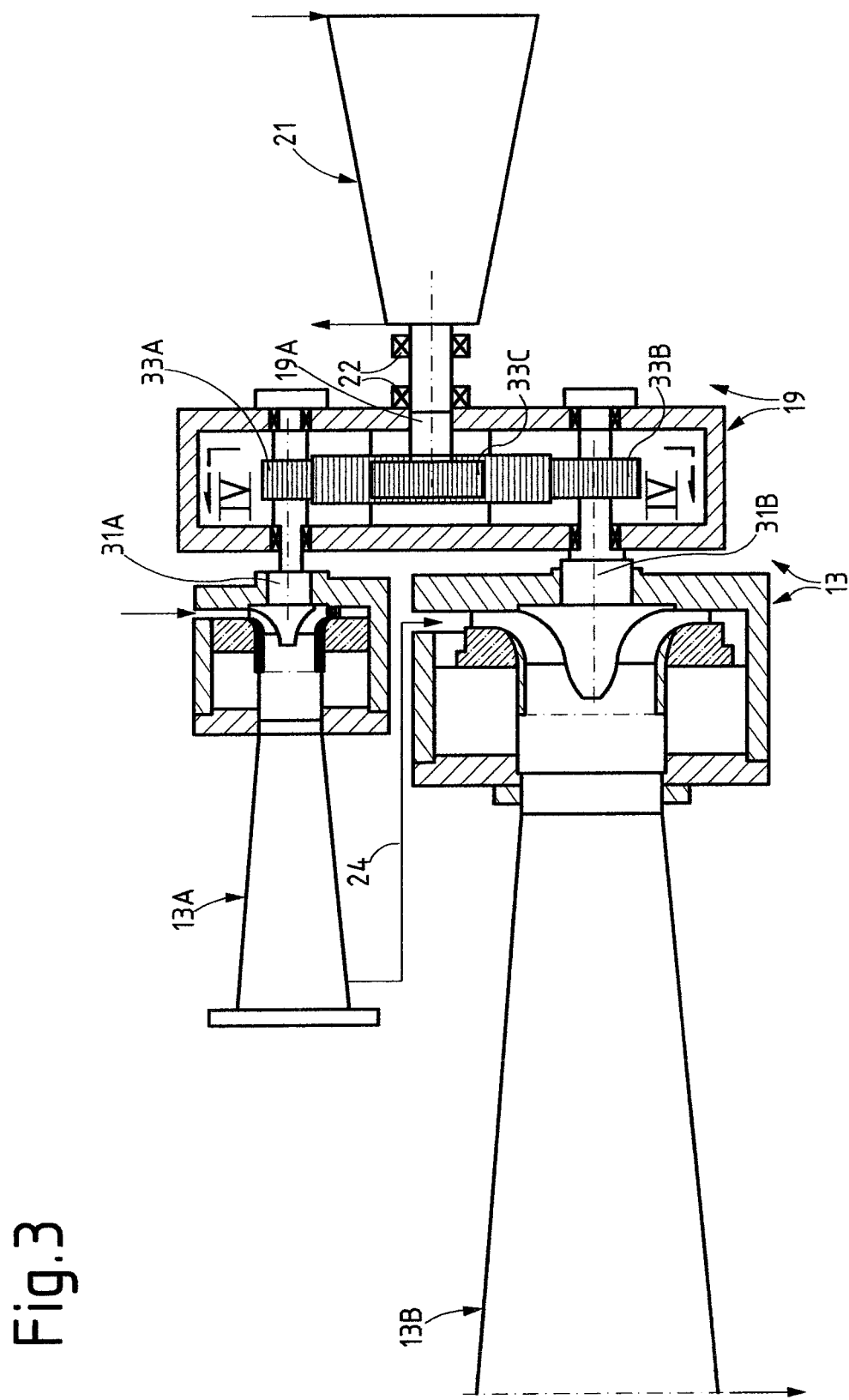
FIG. 3 schematically illustrates features of a two-stage turboexpander according to an embodiment of the present invention.
Figure 4:
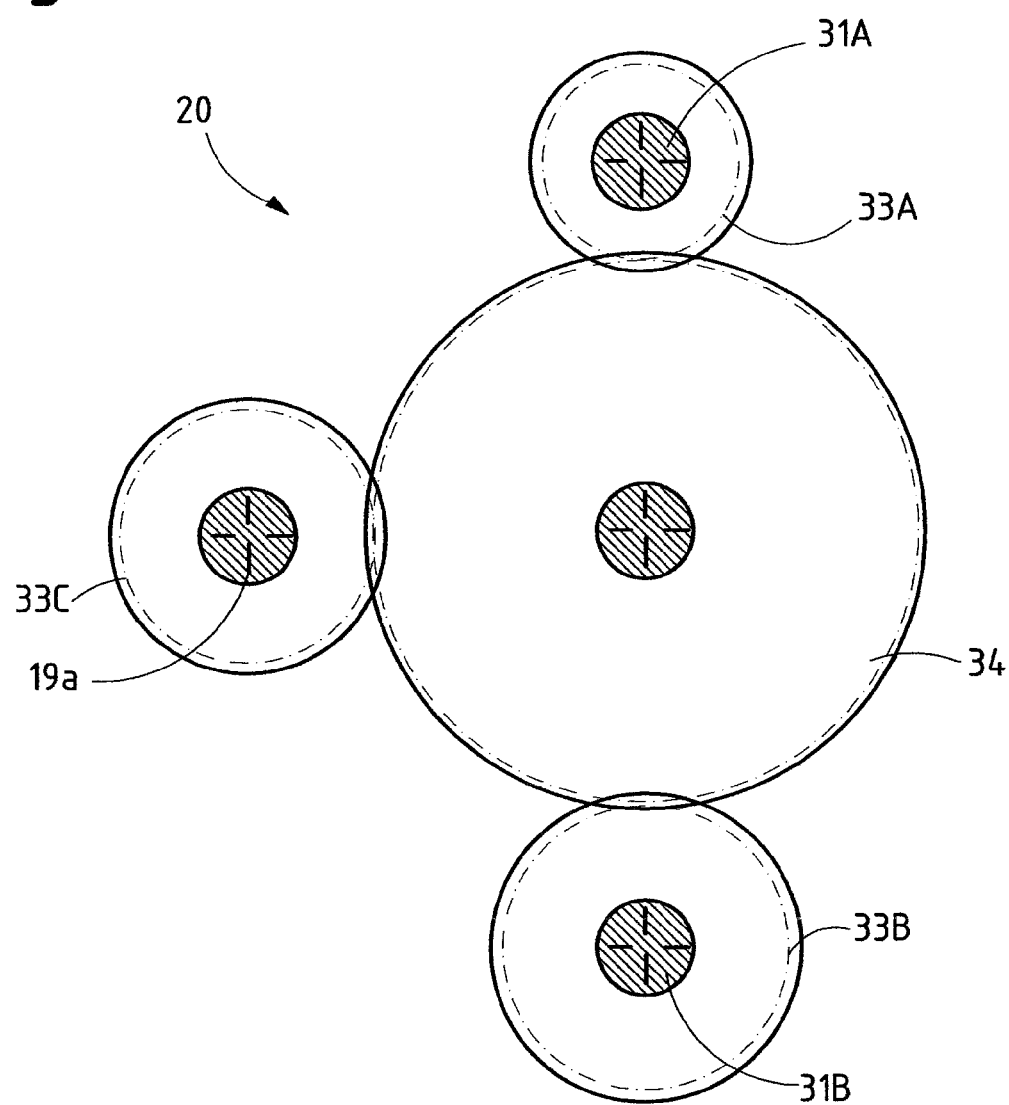
FIG. 4 schematically illustrates features of a two-stage turboexpander according to an embodiment of the present invention.

FIGS. 3 and 4 schematically illustrate the features of a two-stage turboexpander 13, which can be used in the ORC system 5 in FIG. 2. The turboexpander 13 comprises a first, high pressure stage 13A and a second, low pressure stage 13B. The working fluid enters the first, high pressure stage 13A of the turboexpander 13, exits the first turboexpander stage 13A to be delivered through a pipe 24 to the inlet of the second, low pressure stage 13B of the turboexpander 13.

A mechanical transmission 19 is provided between the two-stage turboexpander 13 and the driven turbomachine 21.

In the exemplary embodiment of FIG. 3, the mechanical transmission 19 comprises a gearbox 20 with two driving inlet shafts and one driven outlet shaft. The driving inlet shafts are the shafts of the integrally geared multi-stage turboexpander 13. The outlet shaft is connected to the shaft of the driven turbomachine 21. Reference number 31A designates the first inlet shaft on which a first impeller of the first, high pressure stage 13A of the turboexpander 13 is connected. The first inlet shaft 31A, therefore, rotates at the rotary speed of the impeller of the first, high pressure stage of the turboexpander 13. The impeller of the second, low pressure stage 13B of the turboexpander 13 is connected on a second inlet shaft 31B, which rotates at the rotary speed of the impeller of the second, low pressure stage 13B of the turboexpander 13.

As best shown in FIG. 4, which illustrates a schematic representation of the mechanical transmission 19 in a front view according to line IV-IV of FIG. 3, the gear box 20 comprises a first gear 33A mounted on the first inlet shaft 31A and a second gear 33B mounted on the second inlet shaft 31B. The two gears 33A and 33B mesh with a central crown wheel 34. A third gear 33C of the gearbox 20 is mounted on an output shaft 19A, which is connected, for example through joints 22, to the shaft of the driven turbomachine 21.

The first, second and third gears 33A, 33B and 33C, according to an embodiment, have a diameter smaller than the diameter of the central crown wheel 34.

In some embodiments, the third gear 33C has a diameter smaller than that the diameter of the central crown wheel 34, in order to augment the rotary speed of output shaft 19A connected to the driven turbomachine 21.

A higher speed of the output shaft 19A allows to drive easily a centrifugal compressor 21 that requires to rotate at a higher rotary speed.

The first and second gears 33A and 33B have different diameters in order to provide optimal rotary speed for each impeller of the first and second stage of the turboexpander 13.

In an embodiment, this integrally geared solution is particularly useful in LNG systems or pipeline compression stations.

Additionally, the embodiment of FIGS. 3 and 4 improves the efficiency of the expansion phase, because each impeller can rotate at its optimal rotary speed.

Moreover, the embodiment comprising a plurality of impellers allows exploiting the whole pressure drop of the high-pressure, superheated working fluid.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method for producing mechanical power and driving turbomachines, the method comprising:
    producing mechanical power using a gas turbine and driving a first turbomachine of the turbomachines comprising a compressor or a compressor train therewith;
    transferring heat from exhaust combustion gases of the gas turbine to a thermodynamic organic Rankine cycle system via a first closed heat-transfer loop comprising a heat transfer fluid circulating in the first closed heat-transfer loop transferring heat from the exhaust combustion gases to the thermodynamic organic Rankine cycle system, wherein the thermodynamic organic Rankine cycle comprises a second closed heat-transfer loop comprising a circulating pump, a preheater, a vaporizer, a superheater, an integrally geared multi-stage turboexpander, a recuperator, and a condenser; and
    producing mechanical power with the thermodynamic organic Rankine cycle using the integrally geared multi-stage turboexpander and a mechanical coupling comprising a mechanical transmission, which couples the integrally geared multi-stage turboexpander with a second turbomachine of the turbomachines, and driving the second turbomachine therewith,
        wherein the second turbomachine works in parallel with the first turbomachine.

2. The method of claim 1, further comprising a working fluid circulating in the second closed heat-transfer loop.

3. The method of claim 2, wherein the first closed heat-transfer loop is disposed in a heat exchange relationship with the second closed heat-transfer loop to transfer extracted heat from the heat transfer fluid to the working fluid.

4. The method of claim 1, wherein the heat transfer fluid extracts the heat from the exhaust combustion gases via a heat recovery exchanger.

5. A combined thermodynamic system for the production of mechanical power, the system comprising:
    a gas turbine;
    a first turbomachine comprising a compressor or a compressor train, driven by the gas turbine;
    a heat transfer arrangement configured to transfer heat from exhaust combustion gases of the gas turbine to a thermodynamic organic Rankine cycle system,
        wherein the heat transfer arrangement comprises a first closed heat-transfer loop, and a heat transfer fluid circulating in the heat-transfer loop transferring heat from the exhaust combustion gases to the thermodynamic organic Rankine cycle system, and the thermodynamic organic Rankine cycle system comprises a second closed heat-transfer loop comprising a circulating pump, a preheater, a vaporizer, a superheater, an integrally geared multi-stage turboexpander, a recuperator, and a condenser;
    a second turbomachine driven by the integrally geared multi-stage turboexpander; and
    a mechanical coupling comprising a mechanical transmission which couples the integrally geared multi-stage turboexpander with the second turbomachine driven by the integrally geared multi-stage turboexpander, wherein the second turbomachine works in parallel with the first turbomachine.

6. The system of claim 5, wherein the mechanical transmission comprises a gearbox with two driving inlet shafts and one driven outlet shaft.

7. The system of claim 6, wherein a first inlet shaft of the two driving inlet shafts is connected to a first impeller of a first stage of the integrally geared multi-stage turboexpander.

8. The system of claim 7, wherein a second inlet shaft of the two driving inlet shafts is connected to a second impeller of a second stage of the integrally geared multi-stage turboexpander.

9. The system of claim 8, wherein the first stage is a high pressure stage of the integrally geared multi-stage turboexpander.

10. The system of claim 9, wherein the second stage is a low pressure stage of the integrally geared multi-stage turboexpander.

11. The system of claim 10, wherein the driven outlet shaft is connected to a shaft of the second turbomachine driven by the integrally geared multi-stage turboexpander.

12. The system of claim 5, further comprising an expansion vessel.

13. The system of claim 5, wherein the first closed heat-transfer loop comprises a pump and three serially arranged heat exchangers.

14. A combined thermodynamic system for the production of mechanical power, the system comprising:

a gas turbine;

a first turbomachine comprising a compressor or a compressor train, driven by the gas turbine;

a heat transfer arrangement configured to transfer heat from exhaust combustion gases of the gas turbine to a thermodynamic organic Rankine cycle system, wherein the heat transfer arrangement comprises a first closed heat-transfer loop comprising a heat recovery exchanger, and a heat transfer fluid circulating in the first closed heat-transfer loop, and the thermodynamic organic Rankine cycle system comprises a second closed heat-transfer loop comprising an integrally geared multi-stage turboexpander, a preheater, a vaporizer, and a superheater, and a working fluid circulating in the second closed heat-transfer loop, wherein the heat transfer fluid is configured to extract the heat from the exhaust combustion gases via the heat recovery exchanger, and wherein the first closed heat-transfer loop is disposed in a heat exchange relationship with the second closed heat-transfer loop and configured to transfer extracted heat from the heat transfer fluid to the working fluid;

a second turbomachine driven by the integrally geared multi-stage turboexpander; and a mechanical coupling comprising a mechanical transmission which couples the integrally geared multi-stage turboexpander with the second turbomachine driven by the integrally geared multi-stage turboexpander.

15. The system of claim 14, wherein the mechanical transmission comprises a gearbox with two driving inlet shafts and one driven outlet shaft.

16. The system of claim 14, wherein a first inlet shaft of the two driving inlet shafts is connected to a first impeller of a first stage of the integrally geared multi-stage turboexpander.

17. The system of claim 16, wherein a second inlet shaft of the two driving inlet shafts is connected to a second impeller of a second stage of the integrally geared multi-stage turboexpander.

18. The system of claim 17, wherein the first stage a high pressure stage of the integrally geared multi-stage turboexpander.

19. The system of claim 14, wherein the second closed heat-transfer loop further comprises a circulating pump, a recuperator, and a condenser.

20. The system of claim 14, wherein the preheater, the vaporizer, and the superheater are serially arranged heat exchangers.

* * * * *